US010742005B2

(12) United States Patent
Helmick

(10) Patent No.: US 10,742,005 B2
(45) Date of Patent: Aug. 11, 2020

(54) CABLE PROCESSING APPARATUS AND METHOD

(71) Applicant: The Boeing Company, Chicago, IL (US)

(72) Inventor: Eerik J. Helmick, Seattle, WA (US)

(73) Assignee: The Boeing Company, Chicago, IL (US)

( * ) Notice: Subject to any disclaimer, the term of this patent is extended or adjusted under 35 U.S.C. 154(b) by 502 days.

(21) Appl. No.: 15/497,045

(22) Filed: Apr. 25, 2017

(65) Prior Publication Data

US 2018/0309272 A1    Oct. 25, 2018

(51) Int. Cl.
| | | |
|---|---|---|
| H02G 1/12 | (2006.01) | |
| H01R 43/05 | (2006.01) | |
| B23P 23/00 | (2006.01) | |
| H01R 43/28 | (2006.01) | |

(52) U.S. Cl.
CPC ............ *H02G 1/1256* (2013.01); *B23P 23/00* (2013.01); *H01R 43/05* (2013.01); *H01R 43/28* (2013.01); *H02G 1/12* (2013.01); *H02G 1/1248* (2013.01); *H02G 1/1297* (2013.01)

(58) Field of Classification Search
USPC ....... 81/9.4, 9.51; 29/564.4, 825, 426.4, 877
See application file for complete search history.

(56) References Cited

U.S. PATENT DOCUMENTS

| | | |
|---|---|---|
| 2,902,797 A | 9/1959 | Carpenter |
| 3,095,768 A | 7/1963 | Walstrom |
| 4,597,176 A * | 7/1986 | Shields ................ G02B 6/4498 29/564.4 |
| 4,914,986 A | 4/1990 | Masaki |
| 5,016,398 A | 5/1991 | Fukunaga |
| 5,047,169 A | 12/1991 | Matz |

(Continued)

FOREIGN PATENT DOCUMENTS

DE    4027904    3/1992

OTHER PUBLICATIONS

The Eraser Company Inc. "D1 Wheel Stripper"; https://www.eraser.com/products/wire-cable-strippers-product/wheel-strippers/d1-wheel-stripper . . . Printed Apr. 25, 2017.

(Continued)

*Primary Examiner* — Joseph J Hail
*Assistant Examiner* — Shantese L McDonald
(74) *Attorney, Agent, or Firm* — Perman & Green LLP

(57) ABSTRACT

A cable processing apparatus including a first housing member having a first interface surface, a second housing member having a second interface surface, the second interface surface opposes the first interface surface. At least one abrasive member unit coupled to at least one of the first and second housing members so as to be disposed between the first and second interface surfaces. A controller coupled to the first and second housing members and the at least one abrasive member unit for moving the first and second housing members to clamp a cable extending through the first and second housing members, actuating the at least one abrasive member unit, and moving the second housing member relative to the first housing member to radially expand shielding of the cable where the radially expanded cable shielding is ground off of the cable by the at least one abrasive member unit.

20 Claims, 9 Drawing Sheets

(56) References Cited

U.S. PATENT DOCUMENTS

| | | | | |
|---|---|---|---|---|
| 5,072,632 A | * | 12/1991 | Sayyadi | H02G 1/1265 81/9.51 |
| 5,138,910 A | | 8/1992 | Ishikawa et al. | |
| 5,272,941 A | * | 12/1993 | English | H02G 1/1256 81/9.51 |
| 5,664,324 A | * | 9/1997 | Hoffa | H02G 1/1256 29/33 M |
| 5,819,602 A | * | 10/1998 | Brask | G02B 6/245 81/9.51 |
| 6,546,617 B1 | * | 4/2003 | Hayashi | H02G 1/1202 29/426.4 |
| 2016/0036208 A1 | | 2/2016 | Evans et al. | |

OTHER PUBLICATIONS

Ideal Industries, Inc. "Ideal Coax Cable Stripper—(Rotary Style Stripper)"; http://www.idealindustries.com/prodDetail.do?prodId=45-552&div=6&I1=bench_machines&I2=45-552.

The Schleuniger Group, "CoaxStrip 5200—(Rotary Style Stripper)"; http://www.schleuniger.com/products/p/coaxstrip-5200/.

* cited by examiner

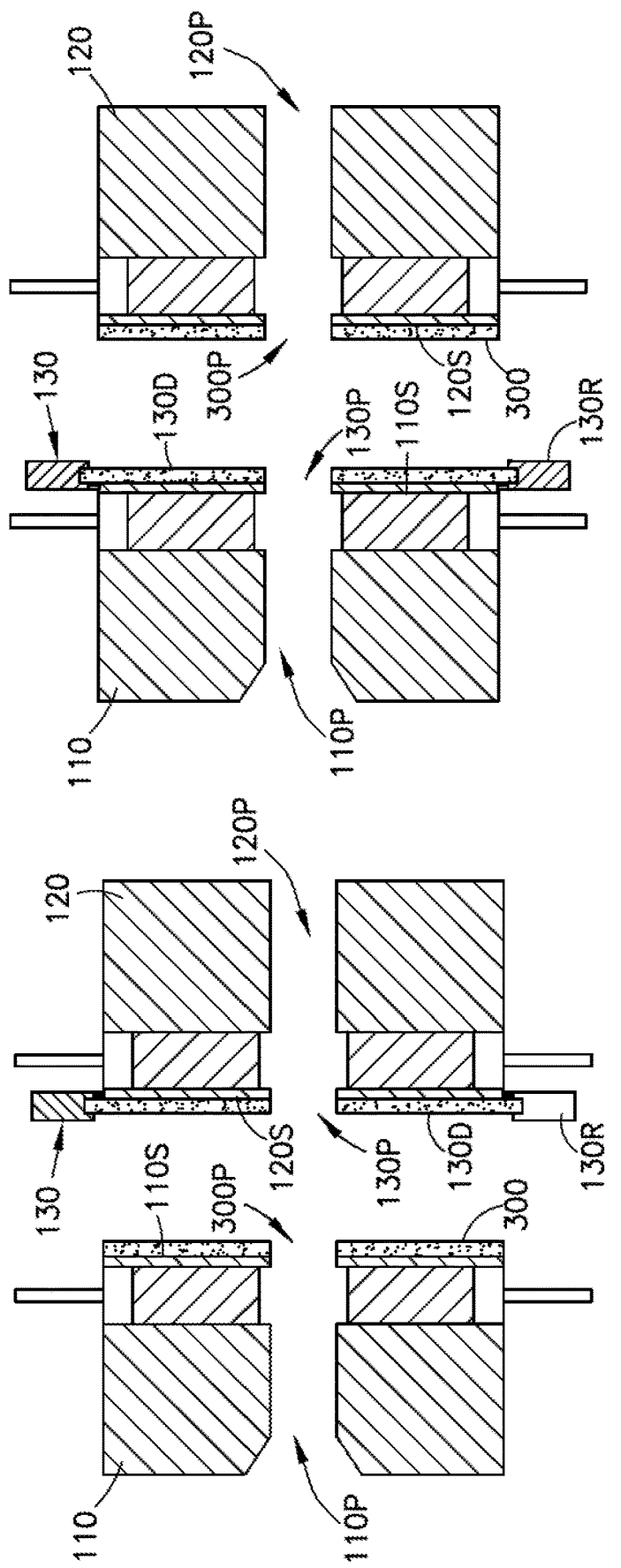

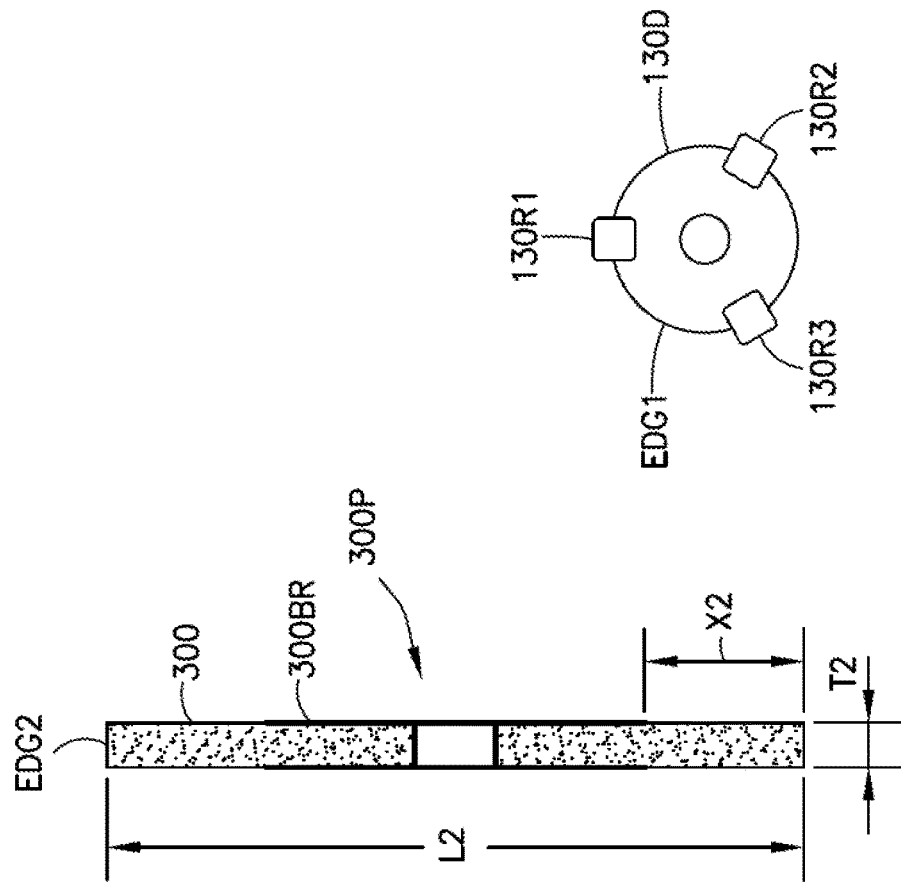
FIG.4
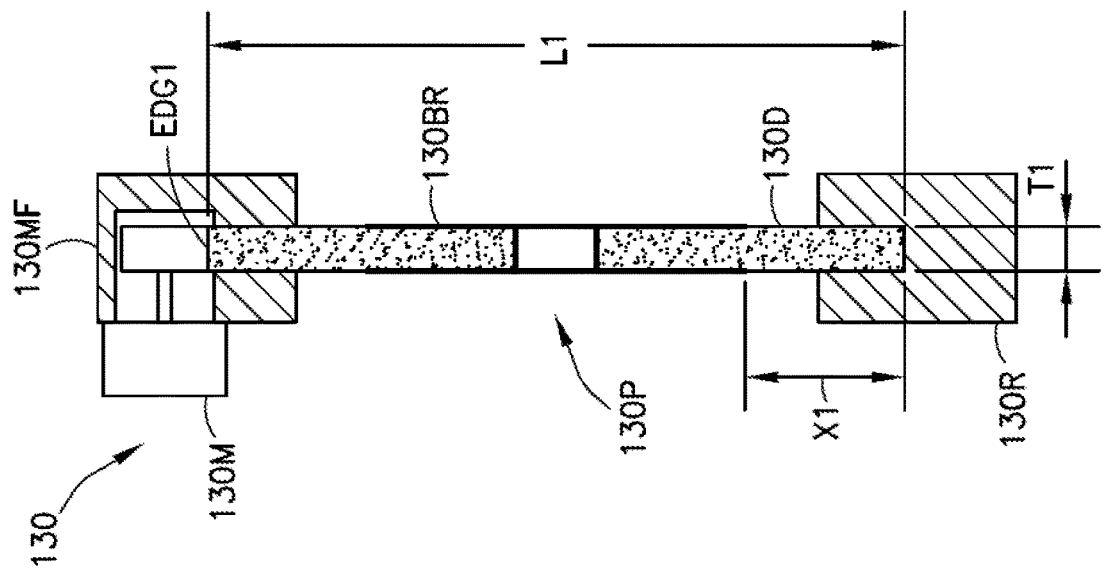
FIG.3
FIG.2

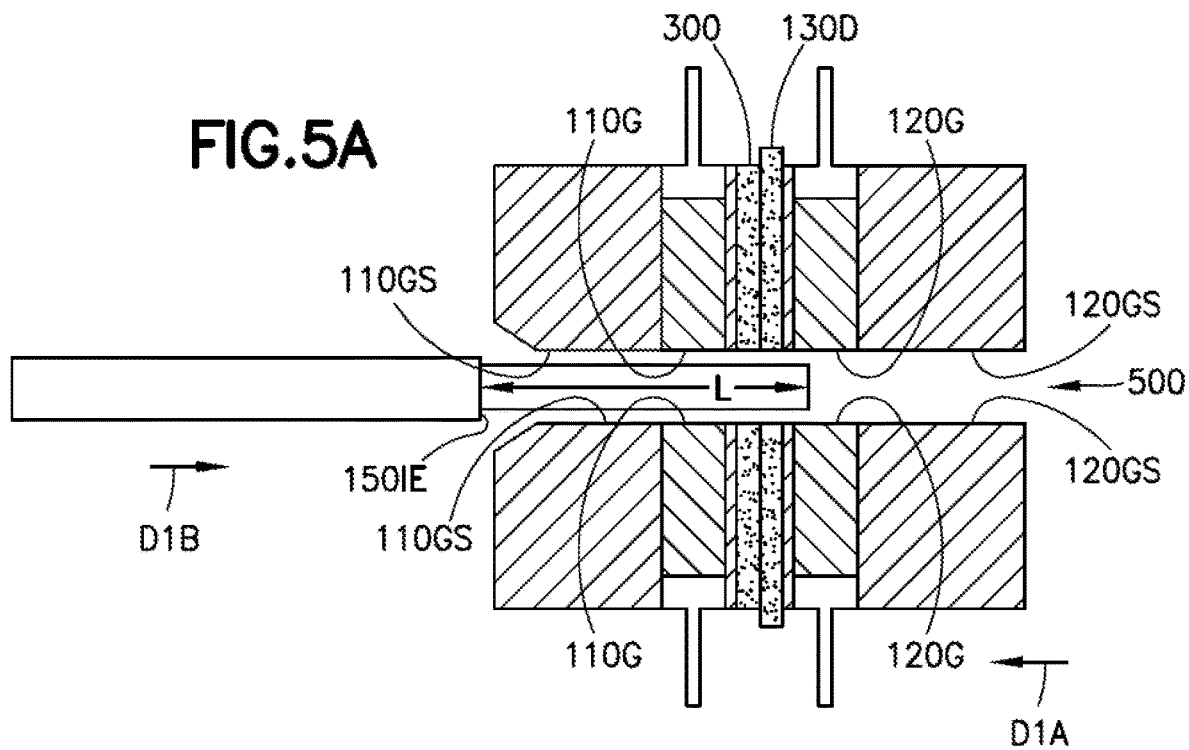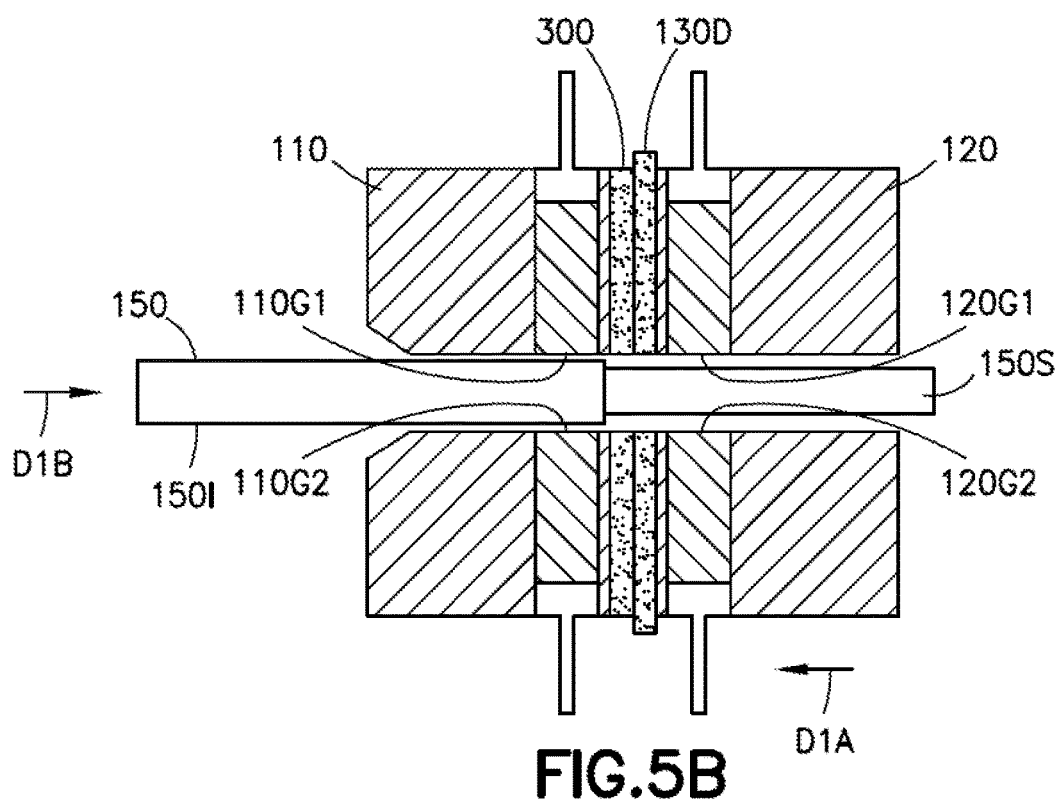

CABLE PROCESSING APPARATUS AND METHOD

BACKGROUND

1. Field

The aspects of the present disclosure generally relate to cable processing and in particular to automated cable processing apparatus and methods

2. Brief Description of Related Developments

A wiring harness includes a bundle of cables, and each cable can include multiple wires (each having a conductor) therein. At least some known cables include one or more wires surrounded by shielding and a wire jacket or insulation. While assembling a wiring harness, a portion of the insulation is removed, and a portion of the exposed shielding is removed to enable a connector to be installed on the exposed conductor. A portion of the exposed shielding is also removed to, for example, place a solder sleeve over the shielding as well as to install contacts on the conductors.

Generally, the insulation and shielding is removed from the cable manually. However, manual insulation and shield removal takes a large amount of time and may produce inconsistent results (e.g. frayed shielding and/or torn insulation). There are automated machines that remove the insulation and cut the shielding. However, these automated machines generally use cutting dies or rotary cutting brushes to cut the shielding. Where cutting dies are used, as the cutting edges on the dies become dull strands of the shielding may not be cut causing the strands of shielding to be pulled from the cable while trying to separate the cut portion of the shielding from the cable; or if enough of the strands of shielding are not cut, the portion of the shielding that is supposed to be removed from the cable may not be removable from the cable due to the uncut strands of shielding. In addition, if the cutting dies are misaligned the dies may contact each other during the shielding cutting process which may damage the cutting dies.

SUMMARY

The following is a non-exhaustive list of examples, which may or may not be claimed, of the subject matter according to the present disclosure.

One example of the subject matter according to the present disclosure relates to a cable processing apparatus comprising: a frame; a first housing member coupled to the frame, the first housing member having a first cable passage extending there through and a first interface surface; a second housing member coupled to the frame so as to move relative to the first housing, the second housing member having a second cable passage extending there through and a second interface surface, where the first cable passage and the second cable passage are arranged in-line with each other along a common axis and the second interface surface opposes the first interface surface; at least one abrasive member unit coupled to at least one of the first housing member and the second housing member so as to be disposed between the first interface surface and the second interface surface; and a controller coupled to the first housing member, the second housing member and the at least one abrasive member unit, the controller being configured to move the first housing member and the second housing member to a clamped position, such that insulation of a cable extending through the first cable passage is clamped by the first housing member and cable shielding of the cable extending through the second cable passage is clamped by the second housing member; actuate the at least one abrasive member unit; and move the second housing member relative to the first housing member, in a direction extending along the cable such that the cable shielding is radially expanded and where the radially expanded cable shielding is ground off of the cable by the at least one abrasive member unit.

Another example of the subject matter according to the present disclosure relates to a cable processing apparatus comprising: a frame; a first housing member coupled to the frame, the first housing member having a first cable passage extending there through and a first interface surface; a second housing member coupled to the frame so as to move relative to the first housing, the second housing member having a second cable passage extending there through and a second interface surface, where the first cable passage and the second cable passage are arranged in-line with each other along a common axis and the second interface surface opposes the first interface surface; a first bearing member coupled to the second housing member so as to be disposed between the first interface surface and the second interface surface, where the first bearing member is configured to rotatably hold a first abrasive disc therein so that a central aperture of the first abrasive disc is disposed in-line with the first cable passage and the second cable passage along the common axis; a first drive member coupled to the second housing member and being configured to drive rotation of the first abrasive disc within the first bearing member; and a controller coupled to the first housing, the second housing and the first drive member, the controller being configured to move the first housing member and the second housing member to a clamped position, such that insulation of a cable extending through the first cable passage is clamped by the first housing member and cable shielding of the cable extending through the second cable passage is clamped by the second housing member; actuate the first drive member; and move the second housing member relative to the first housing member, in a direction extending along the cable such that the cable shielding is radially expanded and where the radially expanded cable shielding is ground off of the cable by at least the first abrasive disc.

Still another example of the subject matter according to the present disclosure relates to a method for processing a cable, the method comprising: positioning one of a cable and a cable processing unit relative to each other so that the cable is disposed within a first and second cable passage, where the cable processing unit includes a first housing member having the first cable passage extending there through and a first interface surface, and a second housing member having the second cable passage extending there through and a second interface surface, where the first cable passage and the second cable passage are arranged in-line with each other along a common axis and the second interface surface opposes the first interface surface; moving the first housing member and the second housing member to a clamped position, such that insulation of a cable extending through the first cable passage is clamped by the first housing member and cable shielding of the cable extending through the second cable passage is clamped by the second housing member; and moving the second housing member relative to the first housing member, in a direction extending along the cable such that the cable shielding is radially expanded and grinding the radially expanded cable shielding off of the cable with at least one abrasive member unit coupled to at least one of the first housing member and the second housing member, where the at least one abrasive member unit is disposed between the first interface surface and the second interface surface.

BRIEF DESCRIPTION OF THE DRAWINGS

Figure 1A:
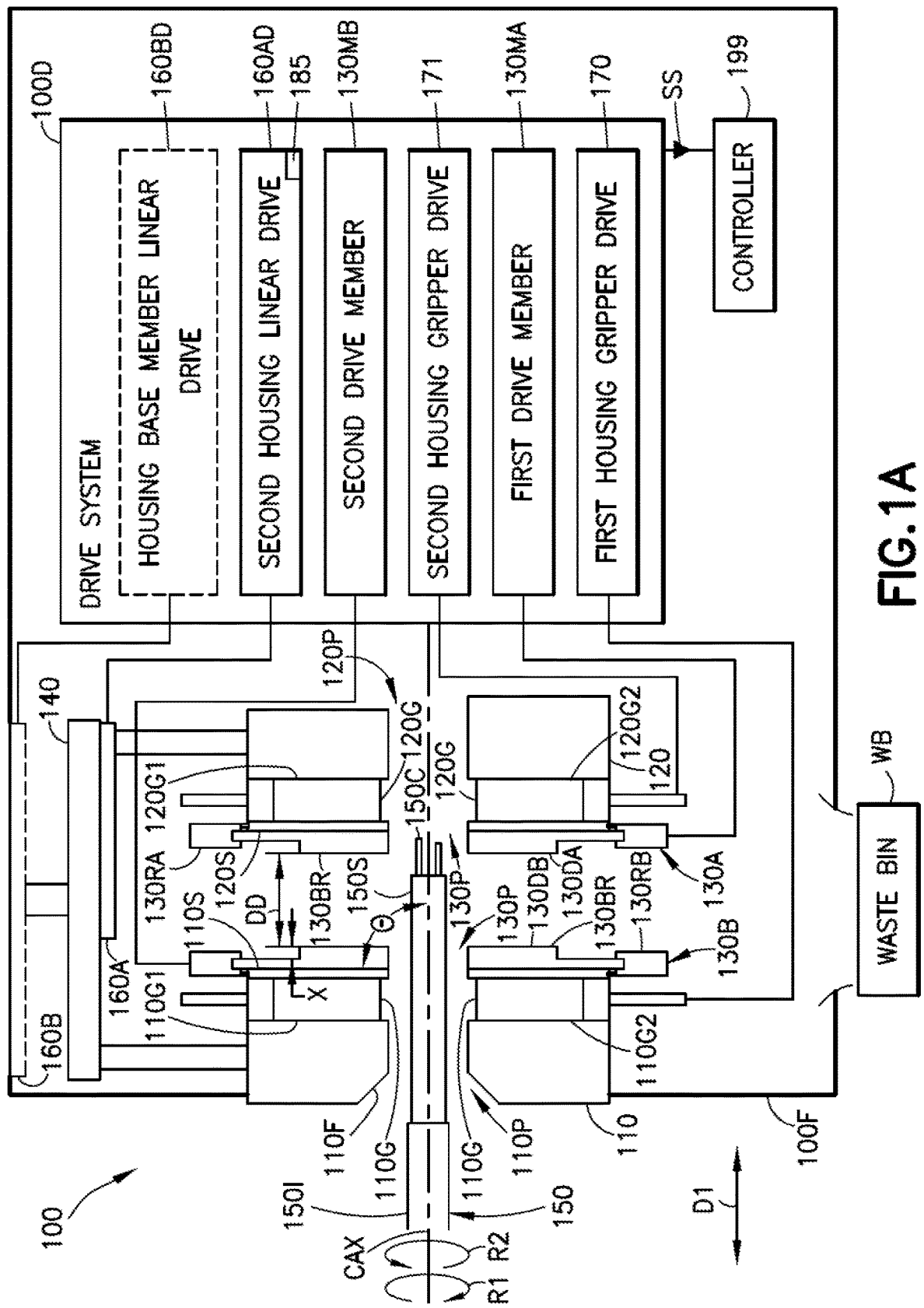
Figure 1D:
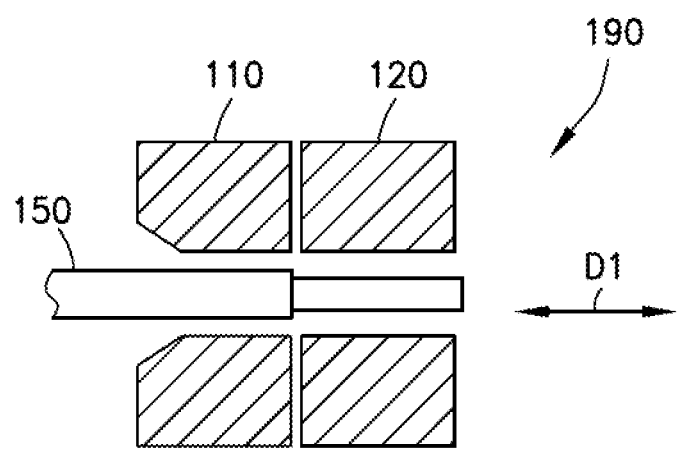
Figure 1E:
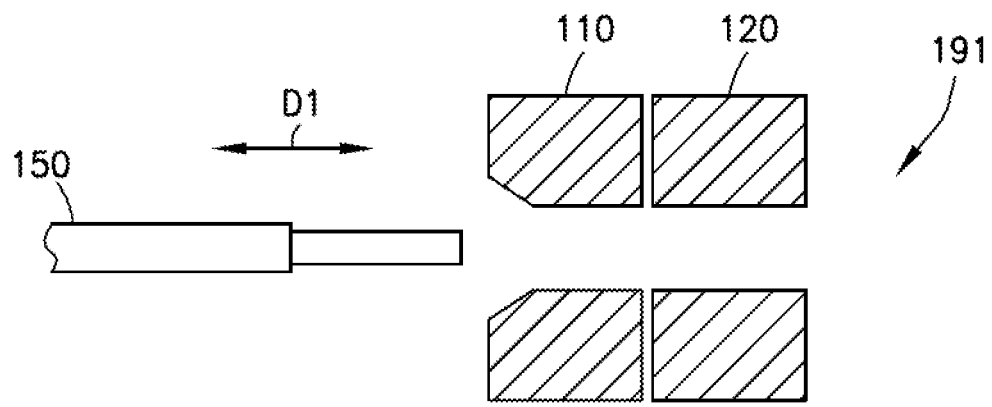
Figure 1F:
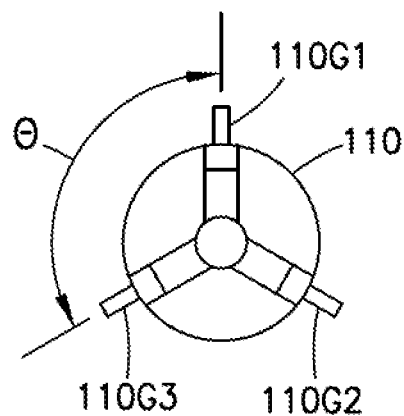
Figure 6:
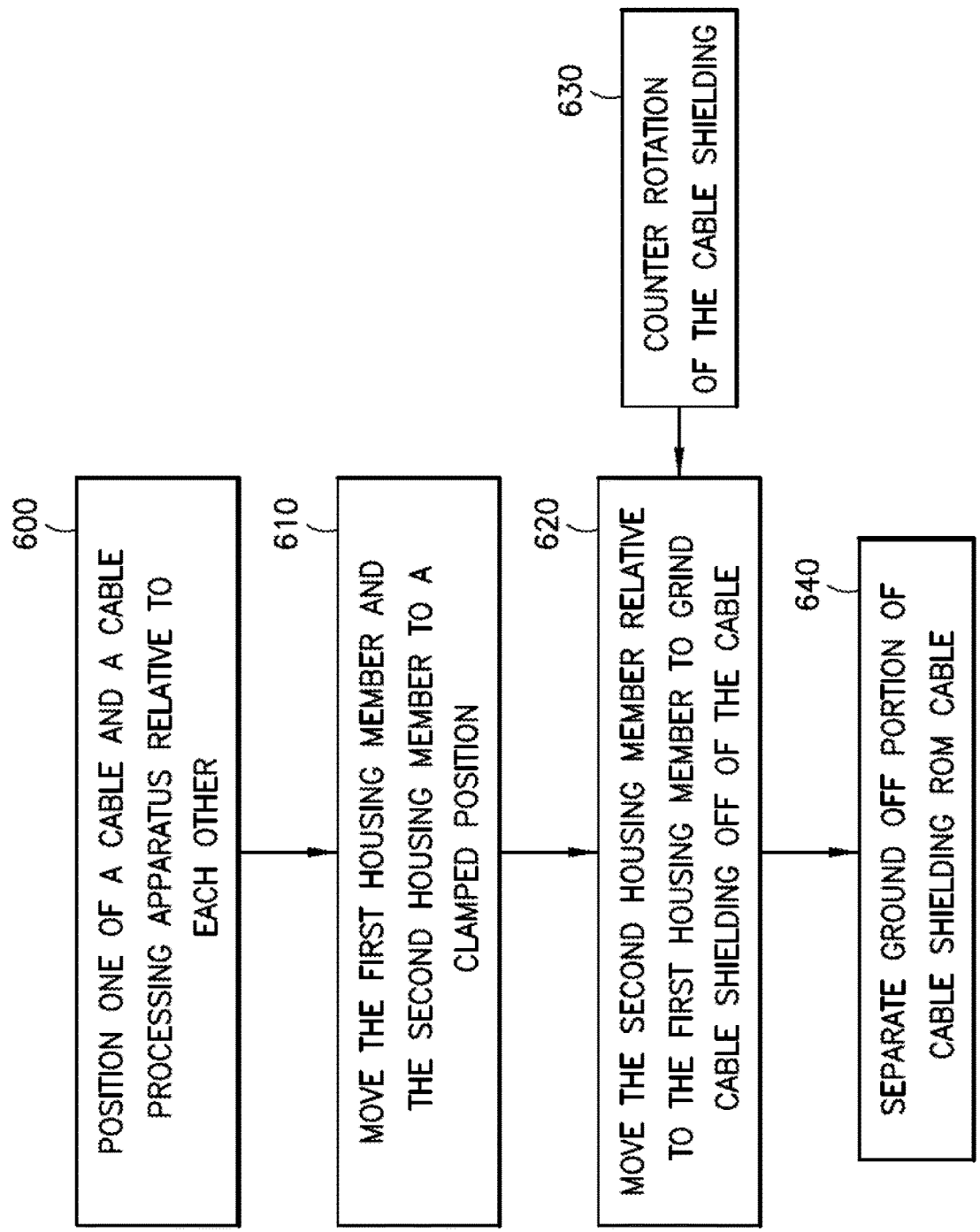
Figure 7A:
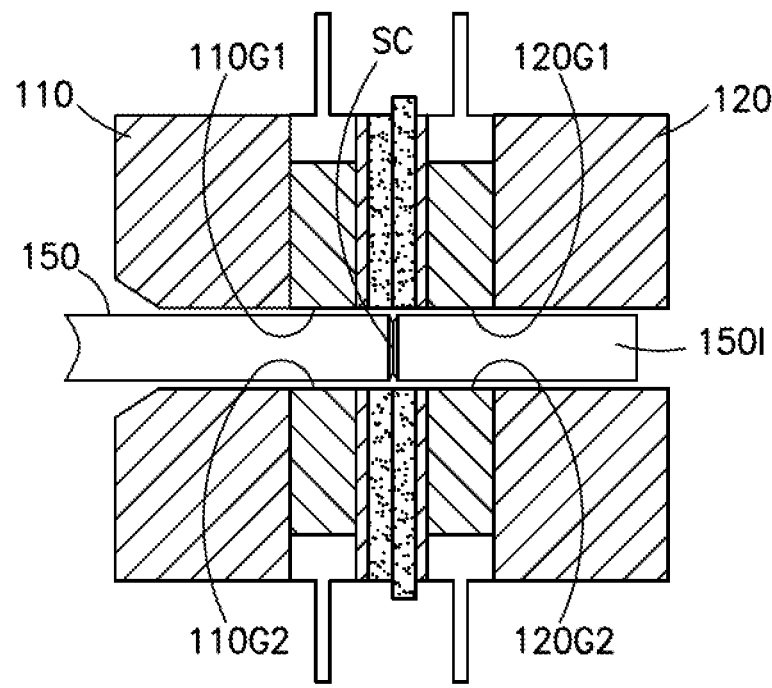
Figure 7B:
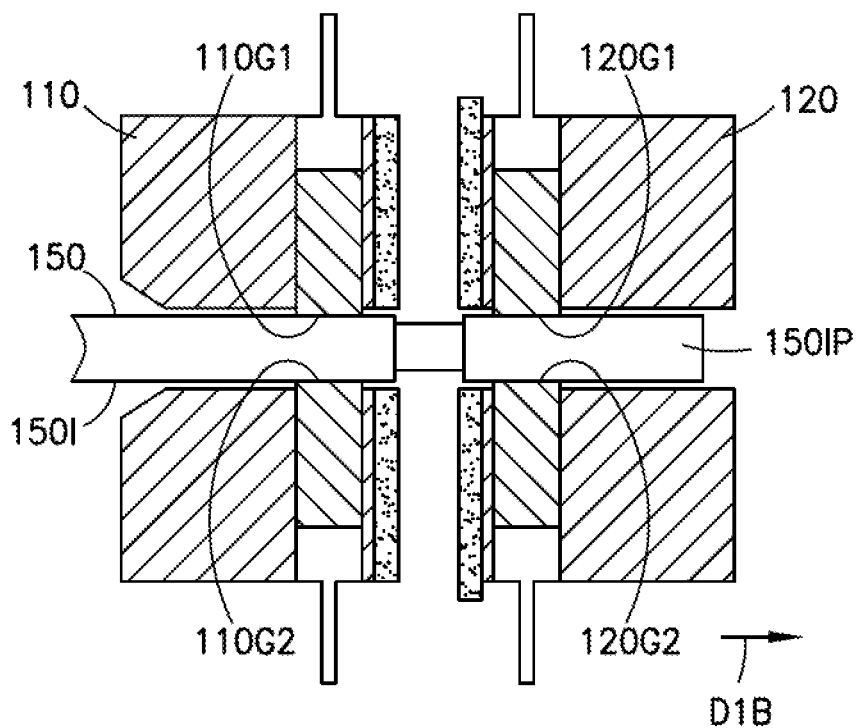

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a schematic illustration of a cable processing apparatus in accordance with aspects of the present disclosure;

FIG. 1B is a cross-sectional view of a portion of the cable processing apparatus of FIG. 1A in accordance with aspects of the present disclosure;

FIG. 1C is a cross-sectional view of a portion of the cable processing apparatus of FIG. 1A in accordance with aspects of the present disclosure;

FIG. 1D is a cross-sectional view of a portion of the cable processing apparatus of FIG. 1A in accordance with aspects of the present disclosure;

FIG. 1E is a cross-sectional view of a portion of the cable processing apparatus of FIG. 1A in accordance with aspects of the present disclosure;

FIG. 1F is a plan view of a portion of the cable processing apparatus of FIG. 1A in accordance with aspects of the present disclosure;

FIG. 2 is a cross-sectional view of an abrasive member unit of the cable processing apparatus of FIG. 1A in accordance with aspects of the present disclosure;

FIG. 3 is a cross-sectional view of a stationary abrasive member of the cable processing apparatus of FIG. 1A in accordance with aspects of the present disclosure;

FIG. 4 is a plan view of an abrasive disc and bearing member of the cable processing apparatus of FIG. 1A in accordance with aspects of the present disclosure;

FIGS. 5A through 5F are cross-section views of a portion of the cable processing apparatus of FIG. 1 illustrating a cable shielding cutting operation in accordance with aspects of the present disclosure:

FIG. 6 is a flow diagram of a method in accordance with aspects of the present disclosure; and FIGS. 7A and 7B are cross-section views of a portion of the cable processing apparatus of FIG. 1 illustrating a cable insulation separation operation in accordance with aspects of the present disclosure.

DETAILED DESCRIPTION

As described above, the shielded cable 150 includes one or more conductors 150C surrounded by the cable shielding 150S, which in turn is surrounded by the insulation 150I. Referring to FIGS. 1A, 2, 3 and 5F a cable processing apparatus 100 is provided and is configured to remove a portion of the cable shielding 150S from the shielded cable 150. The cable processing apparatus 100 utilizes one or more of rotating abrasive discs 130D, 130DA, 130DB and stationary abrasive members 300 (Fig. to grind a radially expanded (e.g. flared) portion of the cable shielding 150S off of the shielded cable 150 so that a ground off shielding portion 150SP of the cable shielding 150S can be removed from the shielded cable 150. It is noted that the "ground off" shielding portion 150SP refers to a portion of the shielding that is separated from the cable by grinding of the cable shielding 150S; where grinding of the cable shielding is the removal of the cable shielding 150S using an abrasive action of an abrasive member where the portion of the cable shielding interfaced with the abrasive disc is reduced to powder or small fragments to separate the shielding portion 150SP from the shielded cable 150. The use of one or more of rotating abrasive discs 130D and stationary abrasive members 300 provides for the separation of the shielding portion 150SP by grinding which may allow for misalignment of the cable holding portions (e.g. a first housing member 110 and a second housing member 120) of the cable processing apparatus 100. The rotating abrasive disc(s) 130D and the stationary abrasive members 300 are easily replaceable in the event of abrasive disc(s) 130D and/or stationary abrasive members 300 wear.

The rotating abrasive disc(s) 130D engage the cable shielding 150S after the cable shielding has been radially expanded and continues to rotate through the radially expanded cable shielding prior to the shielding portion 150SP being removed so that the radially expanded cable shielding is fully or completely ground through. The rotating abrasive disc 130D is rotated by a drive 130M that acts on a perimeter or peripheral edge EDG1 of the abrasive disc 130D and is supported by a bearing member 130R that is coupled to one of the cable holding portions. As will be described herein, the shielded cable 150 is inserted through an aperture 500 formed by the cable holding portions and the one or more of the rotating abrasive discs 130D and the stationary abrasive members 300 where the aperture 500 is sized according to a diameter of the shielded cable 150 to provide minimal clearance between the shielded cable 150 and the one or more of the of the rotating abrasive discs 130D and the stationary abrasive members 300. The minimal clearance between the shielded cable 150 and the one or more of the rotating abrasive discs 130D and the stationary abrasive members 300 may ensure that substantially all of the radially expanded cable shielding is ground off (e.g. removed using an abrasive action as described above) of the shielded cable 150.

Referring now to FIGS. 1A, 1B, 1C and 2, the cable processing apparatus 100 includes a frame 100F a first housing member 110 coupled to frame 100F, and a second housing member 120 coupled to the frame 100F. The first housing member 110 is a monolithic member and includes a first cable passage 110P extending through the first housing member 110 along a common axis CAX. The first housing member also includes a first interface surface 110S arranged at a crossing angle (e.g. greater than 0° and less than 90°) relative to the common axis CAX so that the first interface surface 110S does not extend along the common axis CAX and is transverse to the shielded cable 150 when the shielded cable 150 is inserted through the first cable passage 100P. The first housing member 110 also include a cable guide funnel 110F communicably coupled with the first cable passage 110P. The cable guide funnel 110F is configured to guide the cable 150 into at least the first cable passage 110P.

The second housing member 120 is a monolithic member and includes a second cable passage 120P extending through the second housing member 120 along the common axis CAX so that the first cable passage 110P and the second cable passage 120P are substantially in-line, or concentric, with each other. The second housing member also includes a second interface surface 120S arranged at a crossing angle (e.g. greater than 0° and less than 90°) relative to the common axis CAX so that the second interface surface 120S does not extend along the common axis CAX and is transverse to the shielded cable 150 when the shielded cable 150 is inserted through the second cable passage 120P. The first interface surface 110S and the second interface surface 120S are arranged relative to each other so that the second interface surface 120S opposes the first interface surface 110S.

In one aspect, each of the first housing member 110 and the second housing member 120 include at least two actuable grip members 110G1, 110G2, 120G1, 120G2 configured to grip the cable 150 passing through a respective one of the first cable passage 110P and the second cable passage 120P; however, in other aspects each of the first housing member and the second housing member may have one actuable grip member or more than two actuable grip members. For example, where two actuable grip members 110G1, 110G2, 120G1, 120G2 are provided the two actuable grippers may have an opposing spatial relationship such that the grippers are spaced radially (about the common axis CAX) about 180° apart. As another example, where there are three actuable grippers 110G1, 110G2, 110G3, the three actuable grippers 110G1, 110G2, 110G3 may have spatial relationship such that the grippers are spaced radially (about the common axis CAX) by any suitable angle θ, such as about 120° apart, as illustrated in FIG. 1F with respect to the first housing member 110 (the second housing member 120 may be similarly configured). Each of the actuable grip members 100G1, 110G2, 120G1, 120G2 is configured to move between an extended position and a retracted position. When in the retracted position a grip 110G of each actuable grip member 110G1 of the first housing member 110 and a grip 120G of each actuable grip member 120G1, 120G2 of the second housing member 120 forms a cable guide surface 110GS, 120GS (see FIG. 5A) with the respective one of the first cable passage 110P and the second cable passage 120P.

In the extended position each of the actuable grip members 110G1, 110G2, 120G1, 120G2 engage the cable 150 to prevent movement of at least a portion of the cable 150 relative to a respective one of the first housing member 110 and the second housing member 120. For example, the actuable grip members 110G1, 110G2 of the first housing member 110 are configured to grip the cable insulation 150I to prevent movement of the cable 150 (including the insulation 150I, the cable shielding 150S, and the conductors 150C) relative to the first housing member 110. The actuable grip members 120G1, 120G2 of the second housing member 120 are configured to grip the cable shielding 150S so that a portion of the cable shielding 150S gripped by the actuable gripping members 120G1, 120G2 is prevented from moving relative to the second housing member 120. The actuable grip members 110G1, 110G2 of the first housing member 110 are driven by a first housing gripper drive 170 and the actuable grip members 120G1, 120G2 of the second housing member 120 are driven by a second housing gripper drive 171. The first housing gripper drive 170 and the second housing gripper drive 171 may be any suitable mechanical, pneumatic, hydraulic, electrical, etc. drive configured to move the actuable grip members 110G1, 110G2, 120G1, 120G2 between the extended and retracted positions.

The first housing member 110 and the second housing member 120 are coupled to a housing base member 140. The second housing member 120 is coupled to the housing base member 140 by a first linear actuator 160A. The first linear actuator 160A includes a second housing linear drive 160AD so that the first linear actuator 160A is configured to move the second housing member 120 toward and away from the first housing member 110 in direction D1 along the common axis CAX, such that a distance DD (see FIG. 1A) defined between the first housing member 110 and the second housing member 120 is either decreased or increased. Movement of the second housing member 120 toward and away from the first housing member 110 radially expands the cable shielding 150S and grinds the radially expanded cable shielding 150SE (see FIG. 5E) from the shielded cable 150 as described herein. In another aspect, movement of the second housing member 120 toward and away from the first housing member 110 may radially expand the cable shielding 150S and grind the section of radially expanded cable shielding 150SE (see FIG. 5E) from the shielded cable 150 in separate steps.

In one aspect, the housing base member 140 is stationarily coupled to the frame 100F so that only the second housing member 120 reciprocates along the common axis CAX; while in other aspects, the housing base member 140 is coupled to the frame 100F so that the housing base member 140 reciprocates linearly relative to the frame 100F along the common axis CAX. Here the housing base member 140 is coupled to the frame 100F by a second linear actuator 160B that includes a housing base member linear drive 160BD so that the linear actuator is configured to linearly reciprocate the housing base member 140. Because the first housing member 110 and the second housing member 120 are coupled to the housing base member 140, the first housing member 110 and the second housing member 120 reciprocate along the common axis CAX with the housing base member 140. Reciprocation of both the first housing member 110 and the second housing member 120 as a unit along the common axis CAX provides for the shielded cable 150 being held stationary, such as by a stationary fixture or suitable cable handling automation, where the first housing member 110 and the second housing member 120 move linearly along the common axis CAX relative to shielded cable 150 to insert the shielded cable 150 into (e.g. the cable is disposed within) the cable passages 110P, 120P.

Referring now to FIGS. 1A, 1B, 1C, 2 and 4, the cable processing apparatus 100 also includes at least one abrasive member unit 130 coupled to at least one of the first housing member 110 and the second housing member 120 so as to be disposed between the first interface surface 110S and the second interface surface 120S. In one aspect, as illustrated in FIG. 1A, a first abrasive member unit 130A is coupled to the second housing member 120 adjacent the second interface surface 120S and a second abrasive member unit 130B is coupled to the first housing member 110 adjacent the first interface surface 110S. In another aspect, as illustrated in FIG. 1B, the abrasive member unit 130 is coupled to the second housing member 120 adjacent the second interface surface 120S and a stationary abrasive member 300 is coupled to the first housing member 110 adjacent the first interface surface 110S. In still another aspect, as illustrated in FIG. 1C, the abrasive member unit 130 is coupled to the first housing member 110 adjacent the first interface surface 110S and a stationary abrasive member 300 is coupled to the second housing member 120 adjacent the second interface surface 120S. The first abrasive member unit 130A and second abrasive member unit 130B will be described with respect to the abrasive member unit 130, however it should be understood that the features of the first abrasive member unit 130A and the second abrasive member unit 130B are the same as those described with respect to abrasive member unit 130 and may be referred to herein with the respective prefix "first" and "second". For example, each abrasive member unit 130 includes an abrasive disc 130 (which when referring to the first abrasive member unit 130A the abrasive disc 130 may be referred to as the first abrasive disc 130DA, and when referring to the second abrasive member unit 130B the abrasive disc 130 may be referred to as the second abrasive disc 130DB).

Figure 5C:
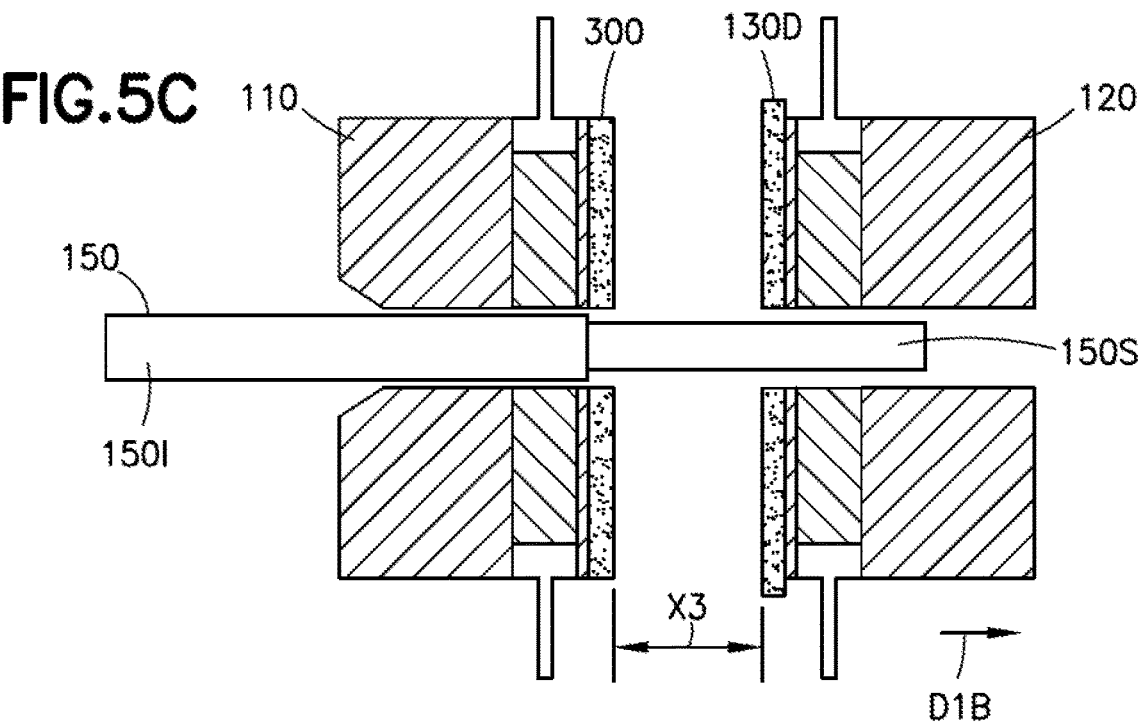
Figure 5D:
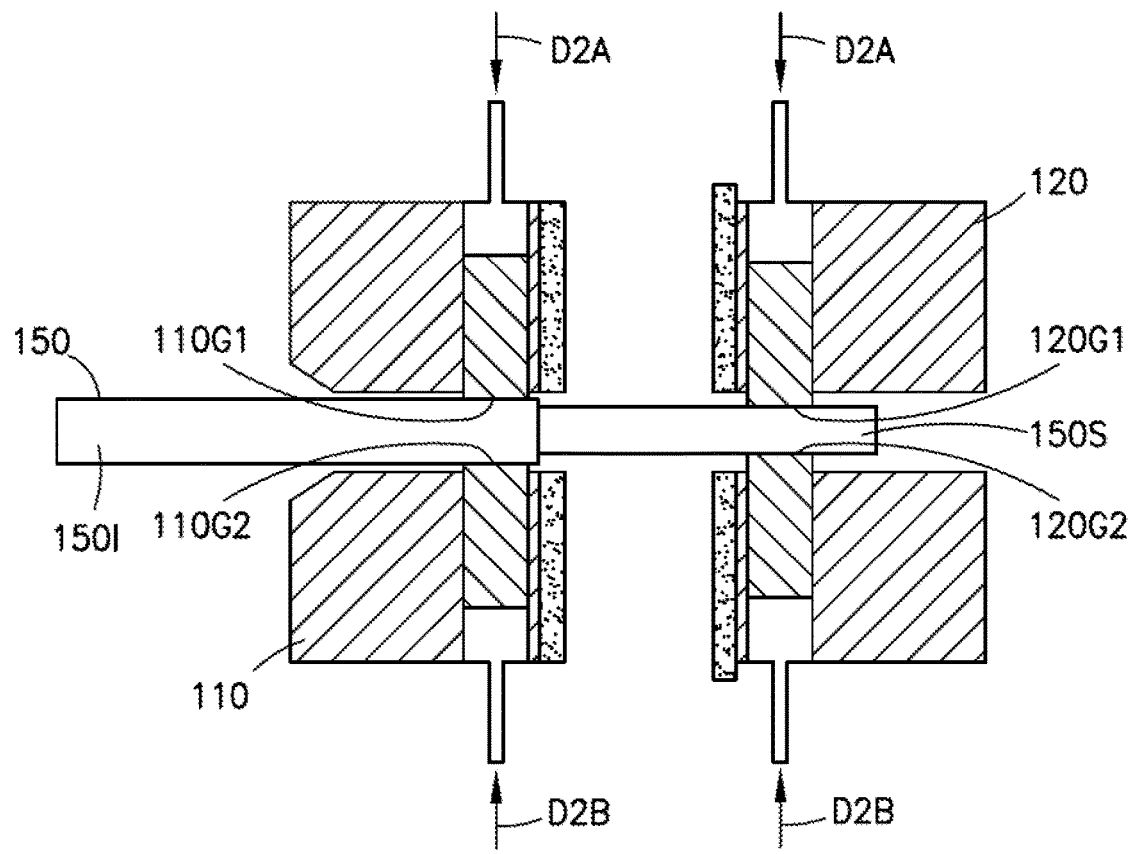
Figure 5E:
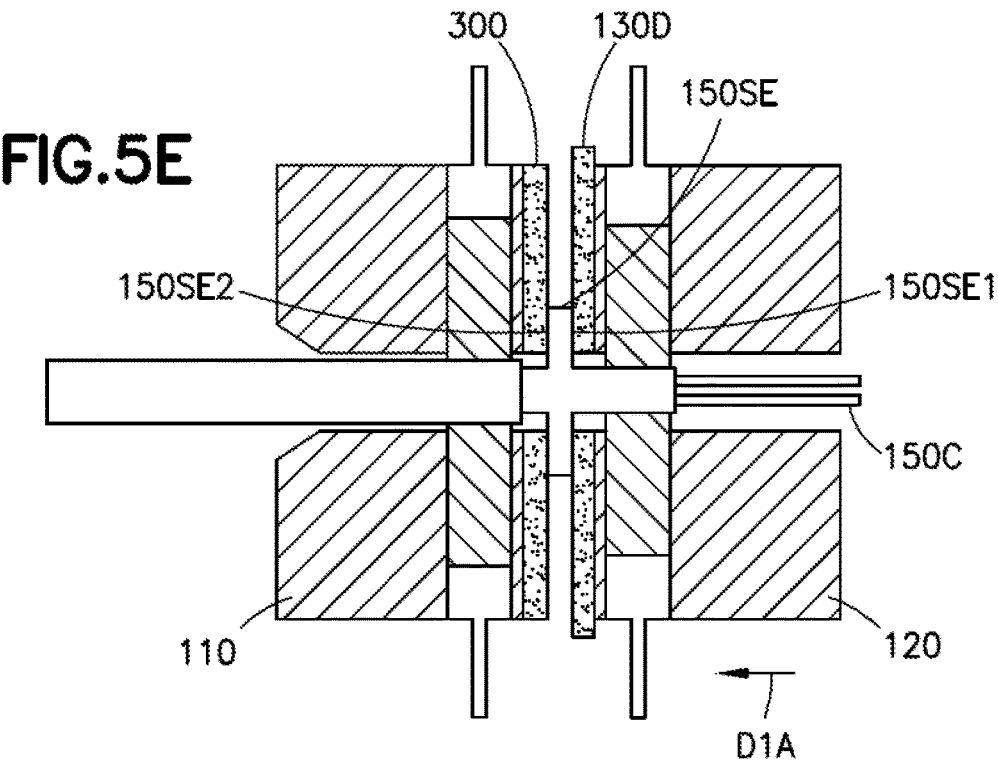

Each abrasive member unit 130 includes the abrasive disc 130, 130A, 130B, a bearing member 130R, 130R 130RA, 130RB, and a drive member 130M, 130MA, 130MB. The abrasive disc 130, 130A, 130B includes a central aperture 130P that is disposed in-line with the first cable passage 110P and the second cable passage 120P along the common axis CAX. The bearing member 130R, 130RA, 130RB is coupled to the respective one of the first housing member 110 and the second housing member 120 and is configured such that the abrasive disc 130, 130A, 130B is rotatably supported by the bearing member 130R, 130RA, 130RB for rotation of the abrasive disc 130, 130A, 130B about the common axis CAX. In one aspect, the bearing member 130R, 130RA, 130RB includes at least two bearing sections radially spaced from each other about the common axis CAX so that the abrasive disc 130, 130A, 130B is stably held within the bearing member 130R, 130LA, 130RB. For example, as illustrated in FIG. 4, in one aspect, the bearing member 130R includes three bearing portions 130R1, 130R2, 130R3 that are radially spaced from one another, but in other aspects the bearing member 130R. 130RA, 130RB may have more or less than three bearing members. As can be seen in FIG. 2, the abrasive disc 130D, 130DA, 130DB includes an abrasive portion 130BR that is spaced from a peripheral edge EDG1 of the abrasive disc 130D, 130DA, 130DB by any suitable distance X1 so that the abrasive portion 130BR does not extend into the bearing member 130R, 130RA. 130RB. The drive member 130M, 130MA, 130MB is configured to rotate the abrasive disc 130D, 130DA, 130DB within the bearing member 130R, 1301RA, 130RB. For example, drive member 130M, 130MA, 130MB is any suitable rotary drive that that engages the peripheral edge EDG1 of the abrasive disc 130D, 130DA, 130DB, such as with a friction drive member 130MF to rotate the abrasive disc 130D, 130DA, 130DB about the common axis CAX. Where each of the first housing member 110 and the second housing member 120 include an abrasive disc 130DA, 130DB mounted thereto, the abrasive disc 130DA, 130DB may be shaped so that the abrasive portion 130BR of the abrasive disc 130DA, 130DB extends beyond a surface of the non-abrasive portion (defined by the distance X), as illustrated in FIG. 1A, of the abrasive disc 130DA, 130BD so that the abrasive portions 130BR interact to grind the cable shielding 150S without interference from the bearing members 130RA, 130RB.

Where each of the first housing member 110 and the second housing member 120 includes the respective first abrasive member unit 130A and second abrasive member unit 130B, the first abrasive disc 130DA and the second abrasive disc 130DB have an opposing spatial relationship with each other so as to engage opposite sides 150SE1, 150SE2 of the radially expanded cable shielding 150SE (see FIG. 5E). One of the first abrasive disc 130A and the second abrasive disc 130B is configured to counter rotation of the radially expanded cable shielding 150SE about the common axis CAX due to rotational forces exerted on the radially expanded cable shielding 150SE by another one of the first abrasive disc 130A and the second abrasive disc 130B. The first abrasive member unit 130A is configured to rotate the first abrasive disc 130A in a first rotation direction R1 about the common axis CAX, and the second abrasive member unit 130B is configured to rotate the second abrasive disc 130B in a second rotation direction R2 about the common axis CAX that is opposite the first rotation direction R1. The counter-rotating first abrasive disc 130A and second abrasive disc 130B may reduce or eliminate rotation or twisting of the cable shielding 150S in one or more of rotational directions R1, R2 during grinding of the radially expanded cable shielding 150SE. For example, engagement of the first abrasive disc 130A with the radially expanded cable shielding 150SE applies a rotational force on the cable shielding 150S in the rotational direction R1. Similarly, engagement of the second abrasive disc 130B with the radially expanded cable shielding 150SE applies a rotational force on the cable shielding 150S in the rotational direction R2. The first drive member 130MA and the second drive member 130MB may be configured to rotate the respective one of the first abrasive disc 130A and the second abrasive disc 130B so that the rotational force exerted on the radially expanded cable shielding 150SE by the first abrasive disc 130A is cancelled by the rotational force exerted on the radially expanded cable shielding 150SE by the second abrasive disc 130B. The abrasive properties of the first abrasive disc 130A and the second abrasive disc 130B may also reduce or eliminate rotation or twisting of the cable shielding 150S in one or more of rotational directions R1, R2 during grinding of the radially expanded cable shielding 150SE.

Referring also to FIG. 3, where only one of the first housing member 110 and the second housing member 120 include the abrasive drive member unit 130 a stationary abrasive member 300 is used in combination with the abrasive disc 130D. For example, as can be seen in FIG. 1B, where the abrasive drive member unit 130 is coupled to the second housing member 120, the stationary abrasive member 300 is coupled to the first interface surface 110S of the first housing member 110. As can be seen in FIG. 1C, where the abrasive drive member unit 130 is coupled to the first housing member 110, the stationary abrasive member 300 is coupled to the second interface surface 120S of the second housing member 120. The stationary abrasive member 300 may be substantially similar to the abrasive disc 1301D. For example, the stationary abrasive member 300 includes a central aperture 300P disposed in-line with the first cable passage 110P and the second cable passage 120P along the common axis CAN. The stationary abrasive member 300 includes an abrasive portion 300BR that is spaced from a peripheral edge EDG2 of the stationary abrasive member 300 by any suitable distance X2 so that as the abrasive portions 130BR, 300BR of die abrasive disc 130D and the stationary abrasive member 300 wear the non-abrasive portions of the abrasive disc 130D and the stationary abrasive member 300, defined by the distances X1, X2, may contact one another to prevent a thickness T1, T2 of the abrasive disc 130D and the stationary abrasive member 300 becoming less than a predetermined thickness. In one aspect, a diameter L2 of the stationary abrasive member 300 may be less than a diameter L1 of die abrasive member so that the stationary abrasive member 300 does not interfere with the bearing member 130R as the first housing member 110 and the second housing member 120 are moved relative to each other along the common axis CAX; while in other aspects the stationary abrasive member 300 may have any suitable size and shape for interfacing with the abrasive disc 130D while not interfering with the bearing member 130R as the first housing member 110 and the second housing member 120 are moved relative to each other along the common axis CAX.

In a manner similar to that above with the opposing abrasive discs, the stationary abrasive member 300 and the abrasive disc 130D have an opposing spatial relationship so as to engage the opposite sides 150SE1, 150SE2 of the radially expanded cable shielding 150SE (see FIG. 5E). The stationary abrasive member 300 is configured to counter rotation of the radially expanded cable shielding 150SE about the common axis CAX due to rotational forces exerted on the radially expanded cable shielding 150SE by the abrasive disc 130D. For example, the abrasive grade (e.g. coarseness) of the abrasive portion 300BR of the stationary abrasive member 300 is such that the rotational forces exerted on the radially expanded cable shielding 150SE by the abrasive disc 130D are reduced or eliminated.

The cable processing apparatus 100 includes a controller 199 that is coupled to a drive system 100D of the cable processing apparatus 100, where the drive system 100D includes the housing base member linear drive 160BD, second housing linear drive 160AD, the first drive member 130MA, the second drive member 130MB, the first housing gripper drive 170, and the second housing gripper drive 171. The controller 199 is coupled to the first housing member 110, the second housing member 120 and the at least one abrasive member unit 130, 130A, 130B through, for example, the drive system 100D. The controller 199 is configured to move the first housing member 110 and the second housing member 120 to a clamped position, such that insulation 150I of the cable extending through the first cable passage 110P is clamped by the first housing member 110 and cable shielding 150S of the cable 150 extending through the second cable passage 120P is clamped by the second housing member 120. For example, the controller is configured to actuate the first housing gripper drive 170 and the second housing gripper drive 171 to move the actuable grippers 110G1, 110G2, 120G1, 120G2 between the extended and retracted positions. The controller 199 is also configured to actuate the at least one abrasive member unit 130, 130A, 130B, such as through actuation of the respective first drive member 130MA and the second drive member 130MB. The controller is further configured to move the second housing member 120 relative to the first housing member 110, in a direction D1 extending along the cable 150 such that the cable shielding 150S is radially expanded and where the radially expanded cable shielding 150SE is ground off (e.g. removed using an abrasive action as described above) of the cable 150 by the at least one abrasive member unit 130, 130A, 130B.

Referring to FIGS. 1A, 1D, and 1E, the controller 199 is also configured to move the first housing member 110 and the second housing member 120 as a unit in direction D1 along the common axis CAX between a cable processing position 190 and a retracted position 191, where when in the retracted position 191 the cable 150 is removed from the first cable passage 110P and the second cable passage 120P. For example, the controller 199 is configured to actuate the housing base member linear drive 160BD for moving the first housing member 110 and the second housing member 120 as a unit in direction D1 along the common axis CAX between a cable processing position 190 and a retracted position 191.

At least one force feedback sensor 185 is coupled to the controller 199 mid the first linear actuator 160A. The force feedback sensor 185 is configured to sense a predetermined actuation force of the linear actuator 160A (e.g. such as a force exerted by the second housing linear drive 160AD of the first linear actuator 160A), where the predetermined actuation force is indicative of a complete grinding off of the radially expanded cable shielding 150SE from the cable 150. The force feedback sensor 185 is configured to send a grinding complete signal SS to the controller 199 in any suitable manner (e.g. through a wired or wireless connection). The controller 199 is configured to, upon receipt of the grinding complete signal SS, arrest movement of the linear actuator 160A to stop the relative movement between the first housing member 110 and the second housing member 120.

Referring now to FIGS. 1A, 5A-5F and 6, an operation of the cable processing apparatus 100 will be described. Here the second housing member 120 includes the abrasive disc 130D and the first housing member includes the stationary abrasive member 300 but it is noted that the operation of the cable processing apparatus 100 is substantially similar with an abrasive disc located on each of the first housing member 110 and the second housing member 120, or where the abrasive disc is located on the first housing member 110 and the stationary abrasive member 300 is located on the second housing member 120. One of the cable 150 and the cable processing apparatus 100 are positioned relative to each other (FIG. 6, Block 600). For example, in one aspect, the cable 150 is movable (such as being held by a human operator or suitable automation) and is inserted into the first cable passage 110P and the second cable passage 120P in direction D1B through the cable guide funnel 110F; while in other aspects, the cable 150 is held stationary and the first housing member 110 and the second housing member 120 are moved in direction D1A as a unit over the cable 150 (such as through actuation of the second linear actuator 160B by the controller 199) so that the cable 150 passes through the cable guide funnel 110F and into the first cable passage 110P and the second cable passage 120P. Where the cable 150 is held stationary and the first housing member 110 and the second housing member 120 are moved relative to the cable 150 for inserting the cable 150 into the first cable passage 110P and the second cable passage 120P, a length L of the exposed cable shielding 150S is known and the controller 199 is programmed to move the first housing member 110, and the second housing member 120 relative to the cable 150 so that the cable 150 is gripped by the first housing member 110 adjacent an end 150IE of the cable insulation 150I. Gripping the cable 150 adjacent the end 150IE of the cable insulation 150I places the end 150IE proximate the abrasive disc 130D so that the cable shielding 150S can be trimmed as close to the cable insulation 150I as possible without grinding the cable insulation 150. Where the cable 150 is inserted into the first cable passage 110P and the second cable passage 120P by automation, again the length L of the exposed cable shielding 150S is known and the automation may be controlled, such as under control of controller 199 or other suitable controller, to insert the cable 150 so that the end 150IE of the cable insulation 150I is positioned relative to the abrasive disc 130D as described above. In other aspects, any suitable sensors may be provided in the cable processing apparatus 100 to detect the end 150IE of the insulation so that signals are sent from the sensors to the controller 199 for positioning the first housing member 110 and the second housing member 120 relative to the cable as described above.

In one aspect, the cable 150 is inserted into the first cable passage 110P and the second cable passage 120P with the first housing member 110 and the second housing member 120 positioned adjacent one another so that the abrasive disc 130D and the stationary abrasive member 300 are in substantial contact. Placing the abrasive disc 130D and the stationary abrasive member 300 in substantial contact reduces or eliminates any space between the abrasive disc 130D and the stationary abrasive member 300 in which the cable 150 can be caught upon insertion of the cable 150 into the first cable passage 110P and the second cable passage 120P; also noting that the a cable guide surface 110GS, 120GS are free of any protrusions or recesses on which the cable 150 can be caught upon insertion of the cable 150 into the first cable passage 110P and the second cable passage 120P.

The first housing member 110 and the second housing member 120 are moved to a clamped position (FIG. 6, Block 610) to grip the cable 150 disposed within the first cable passage 110P and the second cable passage 120P. As shown in FIG. 5C, the second housing member 120 is moved in direction D2A to position the second housing member a predetermined distance X3 away from the first housing member 110, such as by actuation of the second linear drive 160AD by controller 199; and to position the second housing member 120 relative to the cable shielding 150S for radially expanding the cable shielding. The controller 199 actuates the first housing gripper chive 170 and the second housing gripper drive 171 so that the actuable gripper members 110G1, 110G2, 120G1, 120G2 move in directions D2A, D2B from the retracted position to the extended position for gripping a respective portion of the cable 150 as shown in FIG. 5D. As described above, the actuable grippers 110G1, 110G2 of the first housing member 110 grip the cable insulation 150I and the actuable grippers 120G1, 120G2 of the second housing member 120 grip the cable shielding 150S.

The controller 199 actuates the first drive member 130MA so that the abrasive disc 130D is rotated about common axis CAX. Where each of the first housing member 110 and the second housing member 120 include an abrasive member unit 130 the controller activates the first drive member 130MA and the second drive member 130MB so that both abrasive discs 130D rotate in opposite directions (e.g. the first rotation direction R1 and the second rotation direction R2). The second housing member 120 is moved in direction D1A toward the first housing member 110 (where the first housing member 110 is stationary relative to the frame 100F) so that the cable shielding 150S is compressed between the first housing member 110 and the second housing member 120. The compression of the cable shielding 150S causes the cable shielding to radially expand outward relative to the common axis CAX so that the radially expanded cable shielding 150SE extends between the first housing member 110 and the second housing member 120 as illustrated in FIG. 5E. As the second housing member 120 is moved relative to the first housing member 110, in the direction D1A extending along the cable, the radially expanded cable shielding 150SE is ground off (e.g. removed using an abrasive action as described above) of the cable 150 with the abrasive member unit 130, 130A, 130B coupled to one or more of the first housing member 110 and the second housing member 120 (FIG. 6, Block 620). The debris generated during grinding of the radially expanded cable shielding 150SE is removed from the abrasive disc 130D and/or the stationary abrasive member 300 in any suitable manner such as a jet of fluid (e.g. forced or compressed air) passing over and around the first housing member 110 and the second housing member 120. As described above, the rotation of the radially expanded cable shielding 150SE is countered (e.g. reduced or eliminated) during the grinding of the radially expanded cable shielding 150SE (FIG. 6, Block 630) by the stationary abrasive member 300 or the counter-rotating abrasive discs 130D.

Figure 5F:
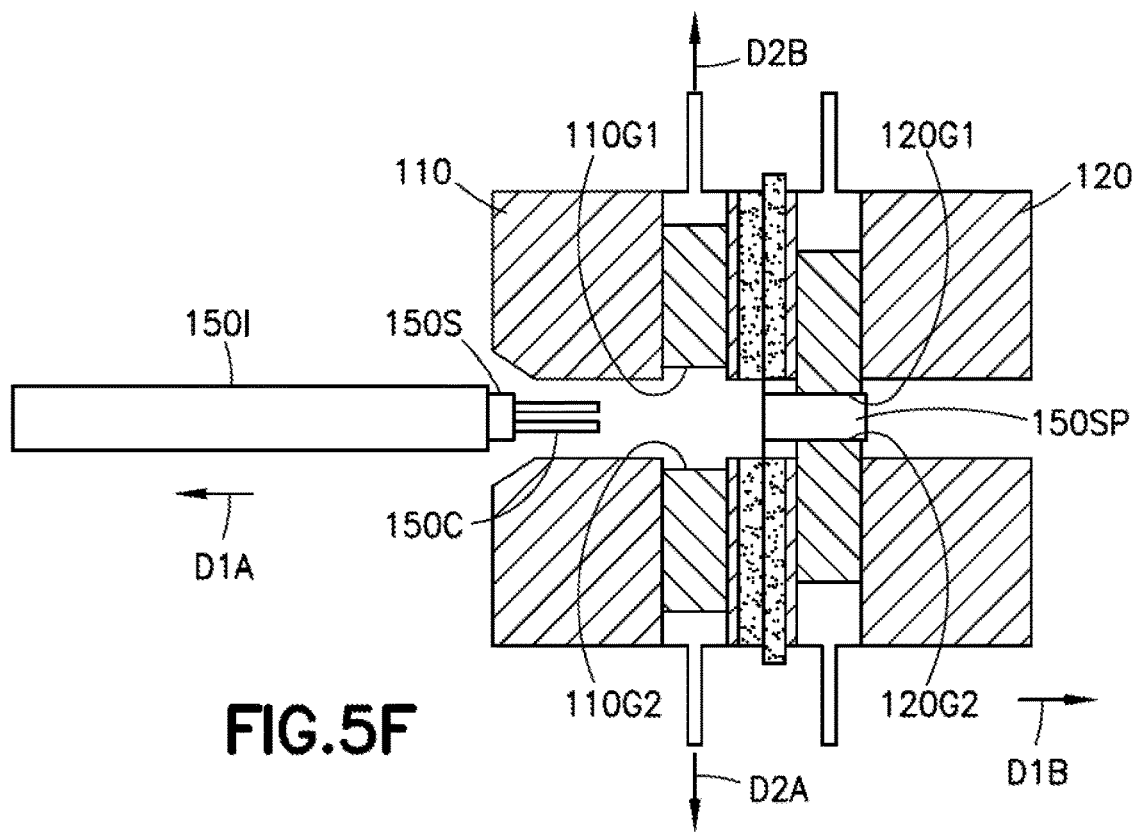

As illustrated in FIG. 5F, the second housing member 120 continues to move towards the first housing member 110 until the abrasive disc 130D is in substantial contact with the stationary abrasive member 300 (or the other abrasive disc 130D coupled to the other one of the first housing member 110 or second housing member 120). The force feedback sensor 185 senses a force exerted by, for example, the second housing linear drive 160AD and sends a signal to the controller when a predetermined force is sensed so that relative movement between the second housing member 120 and the first housing member 110 can be stopped. The ground off (e.g. removed using an abrasive action as described above) shielding portion 150SP is removed from the cable 150 (FIG. 6, Block 640) as illustrated in FIG. 5F. For example, the actuable grip members 110G1, 110G2 of the first housing are moved from the extended position to the retracted position to release the cable 150 while the actuable grip members 120G1, 120G2 of the second housing member 120 remain in the extended position for gripping the ground off shielding portion 150SP. The cable 150 and the first and second housing members 110, 120 are moved relative to each other so that the cable 150 is removed from the cable passage 110P, 120P of the first and second housing members 110, 120. For example, the cable 150 may remain stationary while the first housing member 110 and the second housing member 120 are moved as a unit in direction D1B; the cable may be moved in direction D1A while the first housing member 110 and the second housing member 120 remain stationary relative to the frame 100F; or the cable 150 may be moved in direction D1A while the first housing member 110 and the second housing member 120 are moved as a unit in direction D1B. In one aspect, the abrasive disc 130D and the stationary abrasive member 300 (or the stationary disc 130D coupled to the other one of the first housing member 110 and the second housing member 120) remain in substantial contact with each other as the cable 150 is removed from the first cable passage 110P and the second cable passage 120P so that any strands of the cable shielding 150S that may not be ground through are sheared or otherwise cut from the cable through the relative movement of the first and second housing members 110, 120 and the cable 150.

The actuable grip members 120G1, 120G2 of the second housing member 120 are moved to the retracted position to release the ground off shielding portion 150SP so that the ground off shielding portion 150SP falls into the waste bin WB (see FIG. 1) coupled to the frame. The jet of fluid (e.g. forced or compressed air) passing over and around the first housing member 110 and the second housing member 120 may blow the ground off shielding portion 150SP into the waste bin WB.

Referring to FIGS. 7A and 7B, the cable processing apparatus 100 may also be used to remove a portion of the cable insulation 150IP from the cable 150. For example, the cable insulation 150I includes a score SC where scoring the cable 150 includes penetrating the cable insulation 150I to a predetermined depth in any suitable manner such as by mechanical, optical or thermal means that may include scissors or wire snips, lasers, and thermally heated blades (e.g. hot knife or tweezers). The cable 150 is inserted into the first and second cable passage 110P, 120P in the manner described above so that the score SC is located between the first interface surface 110S of the first housing member 110 and the second interface surface 120S of the second housing member 120. The actuable grip members 110G1, 110G2, 120G1, 120G2 are moved to the extended position to grip the cable insulation 150I on opposite sides (relative to the length of the cable) of the score SC. The second housing member 120 is moved relative to the first housing member 110 in direction D1B so that the second housing member 120 pulls the portion of the cable insulation 150P gripped by the second housing member 120 from the cable insulation 150I gripped by the first housing member 110. As the portion of the cable insulation 150IP is pulled from the cable insulation 150I the cable insulation 150I is torn at the score SC so that the portion of the cable insulation 150IP is torn from the cable insulation 150 and removed from the cable 150.

The following are provided in accordance with the aspects of the present disclosure:

A1. A cable processing apparatus comprising:

a frame;

a first housing member coupled to the frame, the first housing member having a first cable passage extending there through and a first interface surface;

a second housing member coupled to the frame so as to move relative to the first housing, the second housing member having a second cable passage extending there through and a second interface surface, where the first cable passage and the second cable passage are arranged in-line with each other along a common axis and the second interface surface opposes the first interface surface;

at least one abrasive member unit coupled to at least one of the first housing member and the second housing member so as to be disposed between the first interface surface and the second interface surface; and a controller coupled to the first housing member, the second housing member and the at least one abrasive member unit, the controller being configured to move the first housing member and the second housing member to a clamped position, such that insulation of a cable extending through the first cable passage is clamped by the first housing member and cable shielding of the cable extending through the second cable passage is clamped by the second housing member;

actuate the at least one abrasive member unit;

move the second housing member relative to the first housing member, in a direction extending along the cable such that the cable shielding is radially expanded and where the radially expanded cable shielding is ground off of the cable by the at least one abrasive member unit.

A2. The cable processing apparatus of paragraph A1, wherein the at least one abrasive member unit comprises a first abrasive member unit coupled to the second housing member adjacent the second interface surface, the first abrasive member unit including:

a first abrasive disc with a central aperture disposed in-line with the first cable passage and the second cable passage along the common axis;

a first bearing member coupled to the second housing member, the first bearing member being configured such that the first abrasive disc is rotatably supported by the first bearing for rotation of the first abrasive disc about the common axis; and a first drive member coupled to the first abrasive disc, the first drive member being configured to rotate the first abrasive disc within the first bearing member.

A3. The cable processing apparatus of paragraph A2, further comprising:

a stationary abrasive member coupled to the first interface surface and having a central aperture disposed in-line with the first cable passage and the second cable passage along the common axis; and wherein the stationary abrasive member and the first abrasive disc have an opposing spatial relationship so as to engage opposite sides of the radially expanded cable shielding.

A4. The cable processing apparatus of paragraph A3, wherein the stationary abrasive member is configured to counter rotation of the radially expanded cable shielding about the common axis due to rotational forces exerted on the radially expanded cable shielding by the first abrasive disc.

A5. The cable processing apparatus of paragraph A2, wherein the at least one abrasive member unit comprises a second abrasive member unit coupled to the first housing member adjacent the first interface surface, the second abrasive member unit including:

a second abrasive disc with a central aperture disposed in-line with the first cable passage and the second cable passage along the common axis;

a second bearing member coupled to the first housing member, the second bearing member being configured such that the second abrasive disc is rotatably supported by the second bearing for rotation of the second abrasive disc about the common axis; and a second drive member coupled to the second abrasive disc, the second drive member being configured to rotate the second abrasive disc within the second bearing member.

A6. The cable processing apparatus of paragraph A5, wherein the first abrasive disc and the second abrasive disc have an opposing spatial relationship so as to engage opposite sides of the radially expanded cable shielding.

A7. The cable processing apparatus of paragraph A6, wherein one of the first abrasive disc and the second abrasive disc is configured to counter rotation of the radially expanded cable shielding about the common axis due to rotational forces exerted on the radially expanded cable shielding by another one of the first abrasive disc and the second abrasive disc.

A8. The cable processing apparatus of paragraph A1, wherein the at least one abrasive member unit comprises a second abrasive member unit coupled to the first housing member adjacent the first interface surface, the second abrasive member unit including:

a second abrasive disc with a central aperture disposed in-line with the first cable passage and the second cable passage along the common axis;

a second bearing member coupled to the first housing member, the second bearing member being configured such that the second abrasive disc is rotatably supported by the second bearing for rotation of the second abrasive disc about the common axis; and a second drive member coupled to the second abrasive disc, the second drive member being configured to rotate the second abrasive disc within the second bearing member.

A9. The cable processing apparatus of paragraph A8, further comprising:

a stationary abrasive member coupled to the second interface surface and having a central aperture disposed in-line with the first cable passage and the second cable passage along the common axis; and wherein the stationary abrasive member and the second abrasive disc have an opposing spatial relationship so as to engage opposite sides of the radially expanded cable shielding.

A10. The cable processing apparatus of paragraph A9, wherein the stationary abrasive member is configured to counter rotation of the radially expanded cable shielding about the common axis due to rotational forces exerted on the radially expanded cable shielding by the second abrasive disc.

A11. The cable processing apparatus of paragraph A1, wherein each of the first housing member and the second housing member include at least one actuable grip member configured to grip a cable passing through a respective one of the first cable passage and the second cable passage.

A12. The cable processing apparatus of paragraph A11, wherein each of the at least one actuable grip are configured to move between an extended position and a retracted position, and when in the retracted position a grip of the at least one actuable grip forms a cable guide surface with the respective one of the first cable passage and the second cable passage.

A13. The cable processing apparatus of paragraph A1, further comprising a first linear actuator coupled to the frame and the second housing member, the first linear actuator being configured to move the second housing member toward and away from the first housing member along the common axis.

A14. The cable processing apparatus of paragraph A13, further comprising:
at least one force feedback sensor coupled to the controller and the first linear actuator, the force feedback sensor being configured to
sense a predetermined actuation force of the first linear actuator, the predetermined actuation force being indicative of a complete grinding off of the radially expanded cable shielding from the cable, and
send a grinding complete signal to the controller;
wherein the controller is configured to, upon receipt of the grinding complete signal, arrest movement of the first linear actuator.

A15. The cable processing apparatus of paragraph A1, further comprising a housing base member coupled to the frame so as to reciprocate linearly relative to the frame along the common axis, wherein the first housing member and the second housing member are coupled to the housing base member so as to reciprocate linearly relative to the frame with the housing base member along the common axis.

A16. The cable processing apparatus of paragraph A15, further comprising a first linear actuator coupled to the housing base member and the second housing member, the first linear actuator being configured to move the second housing member toward and away from the first housing member along the common axis.

A17. The cable processing apparatus of paragraph A16, further comprising:
at least one force feedback sensor coupled to the controller and the first linear actuator, the force feedback sensor being configured to
sense a predetermined actuation force of the first linear actuator, the predetermined actuation force being indicative of a complete grinding off of the radially expanded cable shielding from the cable, and
send a grinding complete signal to the controller;
wherein the controller is configured to, upon receipt of the grinding complete signal, arrest movement of the first linear actuator.

A18. The cable processing apparatus of paragraph A15, further comprising a second linear actuator coupled to the frame and the housing base member, the second linear actuator being configured to move the housing base member between a cable processing position and a retracted position, where when in the retracted position the cable is removed from the first cable passage and the second cable passage.

A19. The cable processing apparatus of paragraph A1, wherein the second housing member is further configured to clamp insulation of the cable extending through the second cable passage, where relative movement between the first housing member and the second housing member separates the insulation of the cable extending through the second cable passage from the cable.

B1. A cable processing apparatus comprising:
a frame;
a first housing member coupled to the frame, the first housing member having a first cable passage extending there through and a first interface surface;
a second housing member coupled to the frame so as to move relative to the first housing, the second housing member having a second cable passage extending there through and a second interface surface, where the first cable passage and the second cable passage are arranged in-line with each other along a common axis and the second interface surface opposes the first interface surface;
a first bearing member coupled to the second housing member so as to be disposed between the first interface surface and the second interface surface, where the first bearing member is configured to rotatably hold a first abrasive disc therein so that a central aperture of the first abrasive disc is disposed in-line with the first cable passage and the second cable passage along the common axis;
a first drive member coupled to the second housing member and being configured to drive rotation of the first abrasive disc within the first bearing member; and
a controller coupled to the first housing, the second housing and the first drive member, the controller being configured to
move the first housing member and the second housing member to a clamped position, such that insulation of a cable extending through the first cable passage is clamped by the first housing member and cable shielding of the cable extending through the second cable passage is clamped by the second housing member;
actuate the first drive member;
move the second housing member relative to the first housing member, in a direction extending along the cable such that the cable shielding is radially expanded and where the radially expanded cable shielding is ground off of the cable by at least the first abrasive disc.

B2. The cable processing apparatus of paragraph B1, further comprising:
a stationary abrasive member coupled to the first interface surface and having a central aperture disposed in-line with the first cable passage and the second cable passage along the common axis; and
wherein the stationary abrasive member and the first abrasive disc have an opposing spatial relationship so as to engage opposite sides of the radially expanded cable shielding.

B3. The cable processing apparatus of paragraph B2, wherein the stationary abrasive member is configured to counter rotation of the radially expanded cable shielding about the common axis due to rotational forces exerted on the radially expanded cable shielding by the first abrasive disc.

B4. The cable processing apparatus of paragraph B1, further comprising:
a second bearing member coupled to the first housing member adjacent the first interface surface so as to be disposed between the first interface surface and the second interface surface, where the second bearing member is configured to rotatably hold a second abrasive disc therein so that a central aperture of the second abrasive disc is disposed in-line with the first cable passage and the second cable passage along the common axis; and
a second drive member coupled to the first housing member and being configured to drive rotation of the second abrasive disc within the second bearing member.

B5. The cable processing apparatus of paragraph B4, wherein the first abrasive disc and the second abrasive disc have an opposing spatial relationship so as to engage opposite sides of the radially expanded cable shielding.

B6. The cable processing apparatus of paragraph B5, wherein one of the first abrasive disc and the second abrasive disc is configured to counter rotation of the radially expanded cable shielding about the common axis due to rotational forces exerted on the radially expanded cable shielding by another one of the first abrasive disc and the second abrasive disc.

B7. The cable processing apparatus of paragraph B1, wherein each of the first housing member and the second housing member include at least one actuable grip member configured to grip a cable passing through a respective one of the first cable passage and the second cable passage.

B8. The cable processing apparatus of paragraph B7, wherein each of the at least one actuable grip are configured to move between an extended position and a retracted position, and when in the retracted position a grip of the at least one actuable grip forms a cable guide surface with the respective one of the first cable passage and the second cable passage.

B9. The cable processing apparatus of paragraph B1, further comprising a first linear actuator coupled to the frame and the second housing member, the first linear actuator being configured to move the second housing member toward and away from the first housing member along the common axis.

B10. The cable processing apparatus of paragraph B9, further comprising:
at least one force feedback sensor coupled to the controller and the first linear actuator, the force feedback sensor being configured to
sense a predetermined actuation force of the first linear actuator, the predetermined actuation force being indicative of a complete grinding off of the radially expanded cable shielding from the cable, and
send a grinding complete signal to the controller;
wherein the controller is configured to, upon receipt of the grinding complete signal, arrest movement of the first linear actuator.

B11. The cable processing apparatus of paragraph B1, further comprising a housing base member coupled to the frame so as to reciprocate linearly relative to the frame along the common axis, wherein the first housing member and the second housing member are coupled to the housing base member so as to reciprocate linearly relative to the frame with the housing base member along the common axis.

B12. The cable processing apparatus of paragraph B11, further comprising a second linear actuator coupled to the housing base member and the second housing member, the second linear actuator being configured to move the second housing member toward and away from the first housing member along the common axis.

B13. The cable processing apparatus of paragraph B12, further comprising:
at least one force feedback sensor coupled to the controller and the first linear actuator, the force feedback sensor being configured to
sense a predetermined actuation force of the first linear actuator, the predetermined actuation force being indicative of a complete grinding off of the radially expanded cable shielding from the cable, and
send a grinding complete signal to the controller;
wherein the controller is configured to, upon receipt of the grinding complete signal, arrest movement of the first linear actuator.

B14. The cable processing apparatus of paragraph B11, further comprising a first linear actuator coupled to the frame and the housing base member, the first linear actuator being configured to move the housing base member between a cable processing position and a retracted position, where when in the retracted position the cable is removed from the first cable passage and the second cable passage.

B15. The cable processing apparatus of paragraph B1, wherein the second housing member is further configured to clamp insulation of the cable extending through the second cable passage, where relative movement between the first housing member and the second housing member separates the insulation of the cable extending through the second cable passage from the cable.

C1. A method for processing a cable, the method comprising:
positioning one of a cable and a cable processing unit relative to each other so that the cable is disposed within a first and second cable passage, where the cable processing unit includes
a first housing member having the first cable passage extending there through and a first interface surface, and
a second housing member having the second cable passage extending there through and a second interface surface, where the first cable passage and the second cable passage are arranged in-line with each other along a common axis and the second interface surface opposes the first interface surface;
moving the first housing member and the second housing member to a clamped position, such that insulation of a cable extending through the first cable passage is clamped by the first housing member and cable shielding of the cable extending through the second cable passage is clamped by the second housing member;
moving the second housing member relative to the first housing member, in a direction extending along the cable such that the cable shielding is radially expanded and grinding the radially expanded cable shielding off of the cable with at least one abrasive member unit coupled to at least one of the first housing member and the second housing member, where the at least one abrasive member unit is disposed between the first interface surface and the second interface surface.

C2. The method of paragraph C1, wherein the at least one abrasive member unit comprises a first abrasive member unit coupled to the second housing member adjacent the second interface surface and grinding the radially expanded cable shielding off of the cable comprises:
driving rotation of a first abrasive disc with a first drive member, where the first abrasive disc is rotatably supported by a first bearing coupled to the second housing member with a central aperture of the first abrasive disc disposed in-line with the first cable passage and the second cable passage along the common axis.

C3. The method of paragraph C2, further comprising countering rotation of the radially expanded cable shielding about the common axis due to rotational forces exerted on the radially expanded cable shielding by the first abrasive disc with a stationary abrasive member coupled to the first interface surface, wherein the stationary abrasive member has a central aperture disposed in-line with the first cable passage and the second cable passage along the common axis.

C4. The method of paragraph C2, wherein the at least one abrasive member unit comprises a second abrasive member unit coupled to the first housing member adjacent the first interface surface and grinding the radially expanded cable shielding off of the cable further comprises:

driving rotation of a second abrasive disc with a second drive member, where the second abrasive disc is rotatably supported by a second bearing coupled to the first housing member with a central aperture of the second abrasive disc disposed in-line with the first cable passage and the second cable passage along the common axis.

C5. The method of paragraph C4, wherein rotation of the second abrasive disc counters rotation of the radially expanded cable shielding about the common axis due to rotational forces exerted on the radially expanded cable shielding by the first abrasive disc.

C6. The method of paragraph C4, wherein the first abrasive disc and the second abrasive disc grind opposite sides of the radially expanded cable shielding as the second housing member is moved relative to the first housing member.

C7. The method of paragraph C1, wherein the at least one abrasive member unit comprises a second abrasive member unit coupled to the second housing member adjacent the first interface surface and grinding the radially expanded cable shielding off of the cable comprises:

driving rotation of a second abrasive disc with a second drive member, where the second abrasive disc is rotatably supported by a second bearing coupled to the first housing member with a central aperture of the second abrasive disc disposed in-line with the first cable passage and the second cable passage along the common axis.

C8. The method of paragraph C7, further comprising countering rotation of the radially expanded cable shielding about the common axis due to rotational forces exerted on the radially expanded cable shielding by the second abrasive disc with a stationary abrasive member coupled to the second interface surface, wherein the stationary abrasive member has a central aperture disposed in-line with the first cable passage and the second cable passage along the common axis.

C9. The method of paragraph C1, further comprising gripping the cable passing through a respective one of the first cable passage and the second cable passage with at least one actuable gripper of each of the first housing member and the second housing member.

C10. The method of paragraph C9, further comprising moving each of the at least one actuable grip between an extended position and a retracted position to grip and release the cable, and when in the retracted position forming a cable guide surface with a grip of the at least one actuable grip and the respective one of the first cable passage and the second cable passage.

C11. The method of paragraph C1, wherein moving the second housing member relative to the first housing member comprises moving the second housing member toward and away from the first housing member along the common axis with a first linear actuator.

C12. The method of paragraph C11, further comprising:
sensing a predetermined actuation force of the first linear actuator with at least one force feedback sensor, the predetermined actuation force being indicative of a complete grinding off of the radially expanded cable shielding from the cable; and
sending a grinding complete signal to a controller coupled to the first linear actuator:
wherein the controller arrests movement of the first linear actuator upon receipt of the grinding complete signal.

C13. The method of paragraph C1, wherein the first housing member and the second housing member are coupled to a housing base member, the method further comprising linearly reciprocating the housing base member relative to the frame so as to move the first housing member and the second housing member along the common axis.

C14. The method of paragraph C13, further comprising moving the second housing member toward and away from the first housing member along the common axis with a first linear actuator coupled to the housing base member and the second housing member.

C15. The method of paragraph C14, further comprising:
sensing a predetermined actuation force of the first linear actuator with at least one force feedback sensor coupled to a controller and the first linear actuator, the predetermined actuation force being indicative of a complete grinding off of the radially expanded cable shielding from the cable, and
sending a grinding complete signal to the controller;
wherein the controller arrests movement of the first linear actuator upon receipt of the grinding complete signal.

C16. The method of paragraph C13, further comprising moving the housing base member between a cable processing position and a retracted position with a second linear actuator coupled to the frame and the housing base member, where when in the retracted position the cable is removed from the first cable passage and the second cable passage.

C17. The method of paragraph C1, further comprising clamping insulation of the cable extending through the second cable passage with the second housing member, where relative movement between the first housing member and the second housing member separates the insulation of the cable extending through the second cable passage from the cable.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 6, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 6 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:

1. A cable processing apparatus comprising:
    a frame;
    a first housing member coupled to the frame, the first housing member having a first cable passage extending there through and a first interface surface;
    a second housing member coupled to the frame so as to move relative to the first housing member, the second housing member having a second cable passage extending there through and a second interface surface, where the first cable passage and the second cable passage are arranged in-line with each other along a common axis and the second interface surface opposes the first interface surface;
    at least one abrasive member unit coupled to at least one of the first housing member and the second housing member so as to be disposed between the first interface surface and the second interface surface; and
    a controller coupled to the first housing member, the second housing member and the at least one abrasive member unit, the controller being configured to
        move the first housing member and the second housing member to a clamped position, such that insulation of a cable extending through the first cable passage is clamped by the first housing member and cable shielding of the cable extending through the second cable passage is clamped by the second housing member;
        actuate the at least one abrasive member unit; and
        move the second housing member relative to the first housing member, in a direction extending along the cable such that the cable shielding is radially expanded and where the radially expanded cable shielding is ground off of the cable by the at least one abrasive member unit.

2. The cable processing apparatus of claim 1, wherein the at least one abrasive member unit comprises a first abrasive member unit coupled to the second housing member adjacent the second interface surface, the first abrasive member unit including:
    a first abrasive disc with a central aperture disposed in-line with the first cable passage and the second cable passage along the common axis;
    a first bearing member coupled to the second housing member, the first bearing member being configured such that the first abrasive disc is rotatably supported by the first bearing member for rotation of the first abrasive disc about the common axis; and a first drive member coupled to the first abrasive disc, the first drive member being configured to rotate the first abrasive disc within the first bearing member.

3. The cable processing apparatus of claim 2, further comprising:

a stationary abrasive member coupled to the first interface surface and having a central aperture disposed in-line with the first cable passage and the second cable passage along the common axis; and wherein the stationary abrasive member and the first abrasive disc have an opposing spatial relationship so as to engage opposite sides of the radially expanded cable shielding.

4. The cable processing apparatus of claim 2, wherein the at least one abrasive member unit comprises a second abrasive member unit coupled to the first housing member adjacent the first interface surface, the second abrasive member unit including:

a second abrasive disc with a central aperture disposed in-line with the first cable passage and the second cable passage along the common axis;

a second bearing member coupled to the first housing member, the second bearing member being configured such that the second abrasive disc is rotatably supported by the second bearing member for rotation of the second abrasive disc about the common axis; and a second drive member coupled to the second abrasive disc, the second drive member being configured to rotate the second abrasive disc within the second bearing member.

5. The cable processing apparatus of claim 1, wherein the at least one abrasive member unit comprises a second abrasive member unit coupled to the first housing member adjacent the first interface surface, the second abrasive member unit including:

a second abrasive disc with a central aperture disposed in-line with the first cable passage and the second cable passage along the common axis;

a second bearing member coupled to the first housing member, the second bearing member being configured such that the second abrasive disc is rotatably supported by the second bearing for rotation of the second abrasive disc about the common axis; and a second drive member coupled to the second abrasive disc, the second drive member being configured to rotate the second abrasive disc within the second bearing member.

6. The cable processing apparatus of claim 5, further comprising:

a stationary abrasive member coupled to the second interface surface and having a central aperture disposed in-line with the first cable passage and the second cable passage along the common axis; and wherein the stationary abrasive member and the second abrasive disc have an opposing spatial relationship so as to engage opposite sides of the radially expanded cable shielding.

7. The cable processing apparatus of claim 1, wherein each of the first housing member and the second housing member include at least one actuable grip member configured to grip a cable passing through a respective one of the first cable passage and the second cable passage.

8. The cable processing apparatus of claim 7, wherein each of the at least one actuable grip are configured to move between an extended position and a retracted position, and when in the retracted position a grip of the at least one actuable grip forms a cable guide surface with the respective one of the first cable passage and the second cable passage.

9. The cable processing apparatus of claim 1, further comprising a first linear actuator coupled to the frame and the second housing member, the first linear actuator being configured to move the second housing member toward and away from the first housing member along the common axis.

10. The cable processing apparatus of claim 9, further comprising:

at least one force feedback sensor coupled to the controller and the first linear actuator, the force feedback sensor being configured to sense a predetermined actuation force of the first linear actuator, the predetermined actuation force being indicative of a complete grinding off of the radially expanded cable shielding from the cable, and send a grinding complete signal to the controller;

wherein the controller is configured to, upon receipt of the grinding complete signal, arrest movement of the first linear actuator.

11. The cable processing apparatus of claim 1, further comprising a housing base member coupled to the frame so as to reciprocate linearly relative to the frame along the common axis, wherein the first housing member and the second housing member are coupled to the housing base member so as to reciprocate linearly relative to the frame with the housing base member along the common axis.

12. The cable processing apparatus of claim 11, further comprising a first linear actuator coupled to the housing base member and the second housing member, the first linear actuator being configured to move the second housing member toward and away from the first housing member along the common axis.

13. The cable processing apparatus of claim 11, further comprising a second linear actuator coupled to the frame and the housing base member, the second linear actuator being configured to move the housing base member between a cable processing position and a retracted position, where when in the retracted position the cable is removed from the first cable passage and the second cable passage.

14. A cable processing apparatus comprising:

a frame;

a first housing member coupled to the frame, the first housing member having a first cable passage extending there through and a first interface surface;

a second housing member coupled to the frame so as to move relative to the first housing member, the second housing member having a second cable passage extending there through and a second interface surface, where the first cable passage and the second cable passage are arranged in-line with each other along a common axis and the second interface surface opposes the first interface surface;

a first bearing member coupled to the second housing member so as to be disposed between the first interface surface and the second interface surface, where the first bearing member is configured to rotatably hold a first abrasive disc therein so that a central aperture of the first abrasive disc is disposed in-line with the first cable passage and the second cable passage along the common axis;

a first drive member coupled to the second housing member and being configured to drive rotation of the first abrasive disc within the first bearing member; and a controller coupled to the first housing, the second housing and the first drive member, the controller being configured to
move the first housing member and the second housing member to a clamped position, such that insulation of a cable extending through the first cable passage is clamped by the first housing member and cable shielding of the cable extending through the second cable passage is clamped by the second housing member;
actuate the first drive member; and
move the second housing member relative to the first housing member, in a direction extending along the cable such that the cable shielding is radially expanded and where the radially expanded cable shielding is ground off of the cable by at least the first abrasive disc.

15. The cable processing apparatus of claim 14, further comprising:
a stationary abrasive member coupled to the first interface surface and having a central aperture disposed in-line with the first cable passage and the second cable passage along the common axis; and
wherein the stationary abrasive member and the first abrasive disc have an opposing spatial relationship so as to engage opposite sides of the radially expanded cable shielding.

16. The cable processing apparatus of claim 15, wherein the stationary abrasive member is configured to counter rotation of the radially expanded cable shielding about the common axis due to rotational forces exerted on the radially expanded cable shielding by the first abrasive disc.

17. The cable processing apparatus of claim 14, further comprising:

a second bearing member coupled to the first housing member adjacent the first interface surface so as to be disposed between the first interface surface and the second interface surface, where the second bearing member is configured to rotatably hold a second abrasive disc therein so that a central aperture of the second abrasive disc is disposed in-line with the first cable passage and the second cable passage along the common axis; and
a second drive member coupled to the first housing member and being configured to drive rotation of the second abrasive disc within the second bearing member.

18. The cable processing apparatus of claim 17, wherein the first abrasive disc and the second abrasive disc have an opposing spatial relationship so as to engage opposite sides of the radially expanded cable shielding.

19. The cable processing apparatus of claim 14, wherein the second housing member is further configured to clamp insulation of the cable extending through the second cable passage, where relative movement between the first housing member and the second housing member separates the insulation of the cable extending through the second cable passage from the cable.

20. The cable processing apparatus of claim 14, further comprising a housing base member coupled to the frame so as to reciprocate linearly relative to the frame along the common axis, wherein the first housing member and the second housing member are coupled to the housing base member so as to reciprocate linearly relative to the frame with the housing base member along the common axis.

* * * * *